US000001236H

United States Statutory Invention Registration [19]

[11] Reg. Number: H1236

Schabdach et al.

[43] Published: Oct. 5, 1993

[54] POLARITY SENSITIVE GRENADE FIRING SYSTEM

[75] Inventors: Paul G. Schabdach, Churchville; Irving F. Barditch, Baltimore; Scott H. Elwood, Edgewood, all of Md.

[73] Assignee: The United States of America as represented by the Secretary of the Army, Washington, D.C.

[21] Appl. No.: 53,573

[22] Filed: Apr. 28, 1993

[51] Int. Cl.[5] ..... F23Q 7/02; F41C 11/02

[52] U.S. Cl. ..... 102/217; 42/69.01; 89/1.814

*Primary Examiner*—Daniel T. Pihulic

*Attorney, Agent, or Firm*—Anthony T. Lane; Edward Goldberg; Michael Sachs

[57] ABSTRACT

An electrical system for launching separate salvos, comprised of squibs, projectile bombs or the like, at different times but at the same launch location from a remote position using a single electrical control wire for carrying the current. The system is comprised of a negative polarity relay and a positive polarity relay respectively connected with a first and second salvo, a power supply comprised of two 24 volt batteries supplying power to the circuit from opposite terminals, a selecting switch connected with the batteries to select either positive or negative current to match the relay and salvo desired to be fired, an ignition switch for closing the circuit and a single control wire running from the ignition switch to the relays carrying the positive or negative current required for launching the chosen salvo. By using the selector switch and matching the polarity sensitive relay of the salvo to be fired with the enabling current and pressing the ignition switch, only the desired relay contacts close and the projectiles are launched.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLARITY SENSITIVE GRENADE FIRING SYSTEM

GOVERNMENTAL INTEREST

The invention described herein may be manufactured, used, and licensed by or for the Government for Government purposes without payment to us of any royalties thereon.

FIELD OF THE INVENTION

This invention relates to firing salvos comprised of grenades, squibs or the like, and more particularly to a system for separately firing two distinct salvos at different times using a single power control wire.

BACKGROUND OF THE INVENTION

This invention relates to firing salvos comprised of grenades, squibs or the like, and more particularly to a system for separately firing two distinct salvos at different times using a single power transmitting wire.

Grenade salvos require ignition to be fired and are usually ignited using an electrical system originating at a remote spot, a safe distance away from and hidden from the point of actual launching such as from the interior of a tank or other vehicle. Accordingly, the electrical firing system must be connected, by an electric wire, to the salvos. Usually the firing system entails the use of one wire to launch each set of grenades or squibs comprising a salvo.

The current system uses polarized sensitive relays wired to the salvo ignition and fired by electrical current supplied by a power source. Thus, by supplying positive current to a relay, one salvo can be fired and, by supplying negative current to the other relay, the second salvo can be fired. However, prior to this invention a single wire system was not available for firing separate salvos at different points in time. A single wire was not being used for selectively carrying oppositely charged currents to matching polarity sensitive relays for firing only selected salvos.

Therefore, prior to this invention, if more than one salvo launching system was to be set in a particular area, a wire for each would have to be run from the launching spot to the remote area. Similarly, if adding another launching system to the same or neighboring spot was desired, a new wire had to be run.

SUMMARY OF THE INVENTION

The invention described in this application is a grenade firing system providing means for launching from a remote position, distinct grenade salvos at different points in time using only one wire. Accordingly, the system enables the installation of new salvos to be launched at distinct times at a location already in use without running another wire.

In accordance with the invention, the device comprises two grenade salvos each electrically wired to a polarity sensitive relay wherein the relays are of opposite sensitivities; a power supply comprised of two 24 Volt batteries each supplying current to a selecting switch but from oppositely charged terminals; a selecting switch for selecting between the battery and current charge desired for the salvo to be launched; and an ignition switch for directing particularly charged current from the batteries through a single wire to the relays and subsequently igniting the salvos having matching relays.

The batteries are aligned in the circuit such that each supplies current to the selecting switch from a terminal having an opposite polarity than that of the other battery. The oppositely charged current is directed to separate terminals on the selecting switch while the other terminals of each battery are jointly directed to an ignition switch terminal. A positive polarity sensitive relay is wired to a first salvo launching system while a negative polarity sensitive relay is wired to a second salvo launching system.

Upon selecting the salvo desired to be launched, the selector switch is moved into contact with the terminal having the electrical polarity matching the salvo and relay selected. An ignition switch is connected between a single wire running to the relays and the selecting switch. Upon engaging the ignition switch, the circuit is closed and the selected current is directed to the single wire and the salvos.

The current flows to each of the relays but due to the polarity sensitive nature of the relays, only the matching polarity relay will fire. The open contacts of the matching relay close and the desired salvo is launched. If the operator desires to launch the second salvo, the selector switch is simply moved to the other terminal matching the polarity of the other relay. The polarity of each relay can be selected by the way it is connected in the circuit due to a magnet built therein which polarizes the direction of current flow necessary for activation.

BRIEF DESCRIPTION OF THE DRAWINGS

For the purposes of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
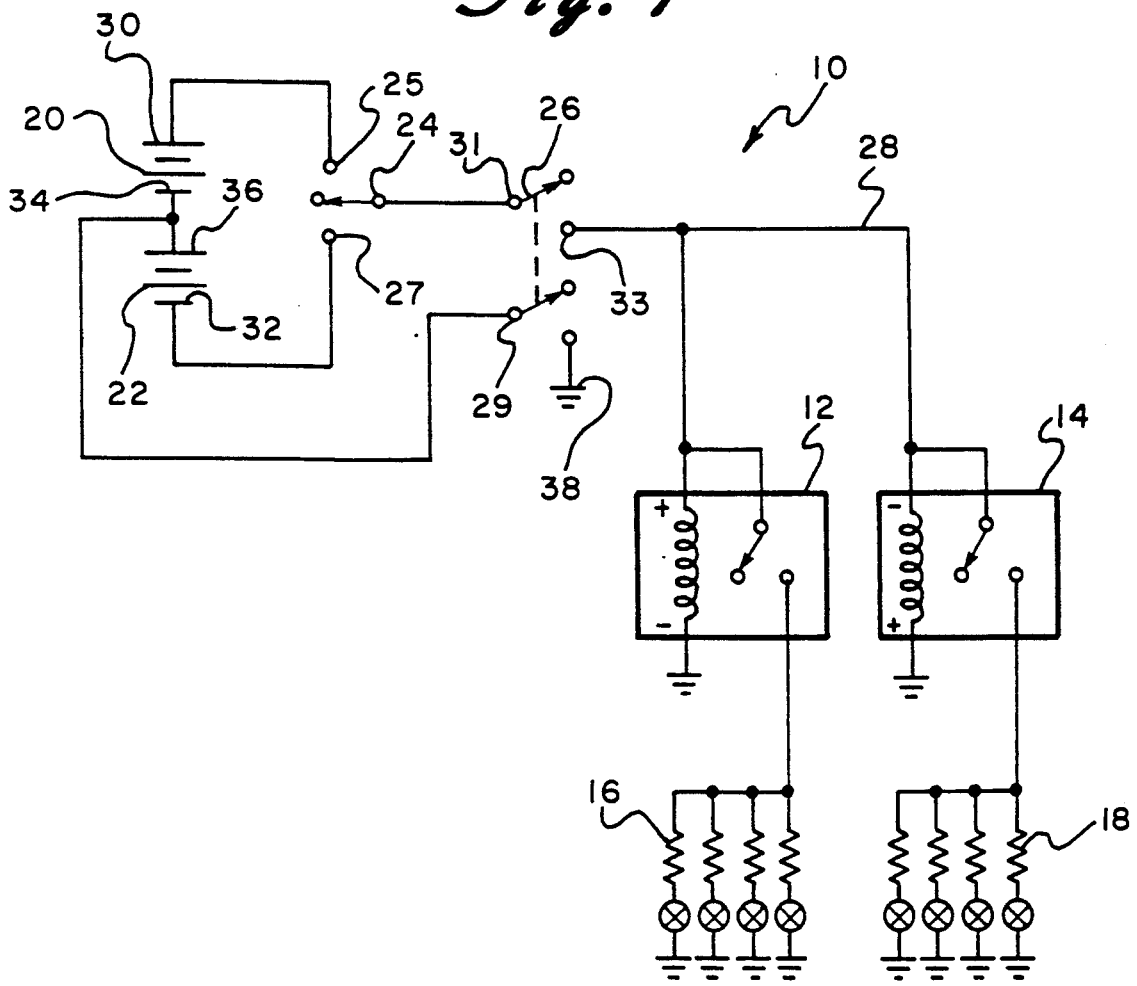
FIG. 1 shows a schematic drawing of the circuit comprising the firing system and its various electrical components.

Referring now to the drawing in detail, there is shown in FIG. 1 a schematic drawing of the electrical circuit comprising the grenade firing system diagrammed in accordance with the general principles of the present invention and designated generally as 10. The grenade firing system 10 is comprised generally of two polarized relays 12 and 14 having opposite polarity sensitivity and two grenade salvos 16 and 18 wired to the relays and located at an actual launching site; two 24 volt batteries 20 and 22 each supplying current from oppositely charged terminals to separate terminals on a single pole double throw selector switch 24, the selecting switch 24 for selecting the current having the charge matching the relay and salvo selected, and an ignition switch 26 all located at a remote operating site; and a single control wire 28 running to the relays at the launch site from the remote operating site for carrying power to the salvos.

The batteries 20 and 22 each supply current to the selecting switch 24 and circuit 10 from oppositely charged terminals. The positive terminal 30 of battery 20 and the negative terminal 32 of battery 22 are each wired to the selecting switch 24 at separate terminals, 25 and 27, respectively. Negative and positive terminals 34 and 36, of batteries 20 and 22 respectively are wired jointly to a terminal 29 on the ignition switch 26.

Grenade salvos 16 and 18 are comprised of squibs, grenades or other projectile type bombs and are located at a remote launching site such as on the exterior of a vehicle. The polarized relays 12 and 14, wired to the salvos 16 and 18, respectively, are polarity sensitive such that they only operate when current of the proper polarity is applied from the batteries 20 and 22 through a single wire 28. When the proper current is selected by selector switch 24 from either of the positive or negative terminals 30 or 32 of batteries 20 and 22, and delivered to the matching relay, the relay fires thereby igniting the salvo wired to it. The polarity of each relay can be selected by the way it is connected in the circuit due to a magnet built therein which polarizes the direction of current flow necessary for activation. The single control wire 28 carries either the positive or negative current as determined by the selecting switch 24. The selecting switch 24 and polarity sensitive relays 12 and 14 allow the one wire 28 to be used for firing one or more salvos at a particular point in time and for firing yet another one or set of salvos at a later point in time without changing the wire 28 connections at the launch site or operating site.

However, to accomplish the firing of the salvos, the selected current must first be delivered to the relays 16 and 18 via the ignition switch 26. The ignition switch 26 is a typical momentary contact two pole switch mechanism. Upon engaging the ignition switch 26, the circuit is closed. Current at terminal 31 having the desired polarity flows to both relays 12 and 14 through the single control wire 28 while the common battery terminals, 34 and 36, connected to switch terminal 29 is grounded to chassis 38. However, only the matching relay will activate and allow the power to travel to the ignition system of the salvo. Thus, a particular salvo 16 or 18, can be fired by selecting the matching current with the selector switch 24 and allowing the current to flow to the relays via ignition switch 26.

The circuit 10 is used by first setting up the salvos such that one or more salvos have negatively polarized relays and one or more other salvos have positively polarized relays. A single control wire 28 supplies power to each of the relays, for example 12 and 14, and their respective salvos. The wire is run to a remote operating location such as the interior of a vehicle wherein the rest of the circuit is maintained and is connected to the terminal 33 of the ignition switch 26. Upon selection of the salvo(s) desired to be fired, for example positively polarized salvo 16, the matching current, is selected via selecting switch 24 and run to terminal 31 of the ignition switch 26. The salvo 16 selected is now ready for firing.

The ignition switch 26 is then engaged thereby closing the circuit allowing current to flow to the relays and firing salvo 16. By switching the selector switch 24 to the negative terminal 27, salvo 18 can be fired at a later time. Additional salvos can be added without running another control wire by simply wiring the ignition system and relays of the additional salvos to wire 28. Similarly, this circuit can be added to the operating location of firing systems set up prior to this invention if one desires to add additional salvos to a pre-existing launching site. New salvos for synchronous or non-synchronous launching could be added without running another control wire to the launch site by simply tapping into the main wire.

The present invention may be embodied in other specific forms without departing from the spirit or essential attributes thereof and accordingly reference should be made to the appended claims rather than to the foregoing specification as indicating the scope of the invention.

What is claimed is:

1. A polarity sensitive grenade firing system for firing independent grenade salvos, comprising:
   (a) first and second grenade salvos;
   (b) a positively polarized relay connected to said first salvo and being wired thereto so that said first salvo can be fired only when said positive relay is energized;
   (c) a negatively polarized relay connected to said second salvo and being wired thereto so that said second salvo can be fired only when said negative relay is energized;
   (d) a power supply capable of providing said system with a positive voltage source or a negative voltage source;
   (e) switch means for selecting between said positive and negative voltage sources, and
   (f) a single control wire connected between said switch means and said relays for carrying power from said power supply to said salvos.

2. The invention as claimed in claim 1 wherein said switch means includes a single pole double throw switch.

3. The invention according to claim 1 wherein said power supply comprises first and second batteries wired to said switch for supplying current to said system, the positive terminal of said first battery and the negative terminal of said second battery being wired to separate terminals of the switch, the negative terminal of said first battery and the positive terminal of said second battery being connected together and to ground.

4. The invention according to claim 1 wherein said salvos are comprised of squibs having ignition systems, said squibs being ignited by said power from said batteries causing normally open contacts of said relays to close and thereby transmit power from said batteries to said ignition system for igniting said squibs.

* * * * *